Feb. 23, 1960 J. M. HOLAHAN 2,925,964
DRAG FOR FISHING REELS
Filed Aug. 15, 1957
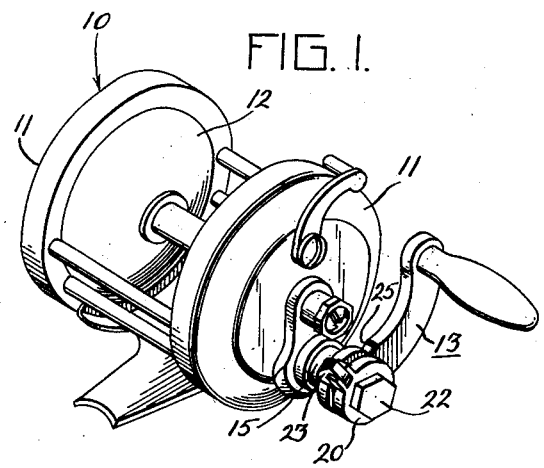
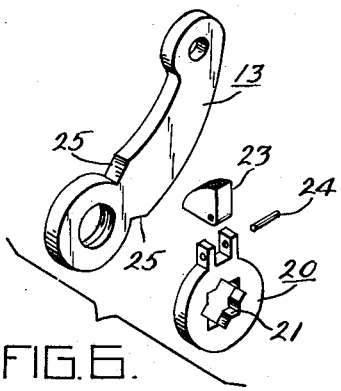
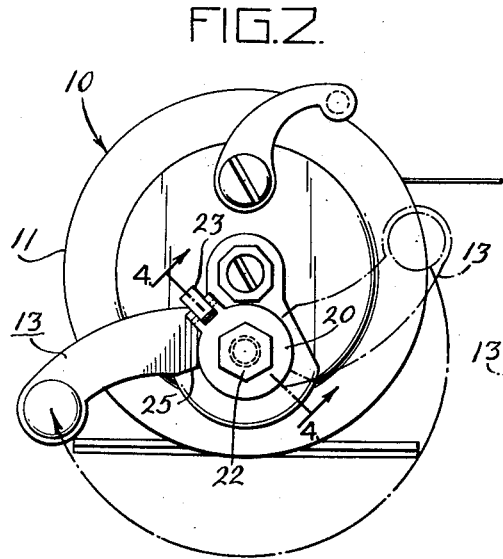
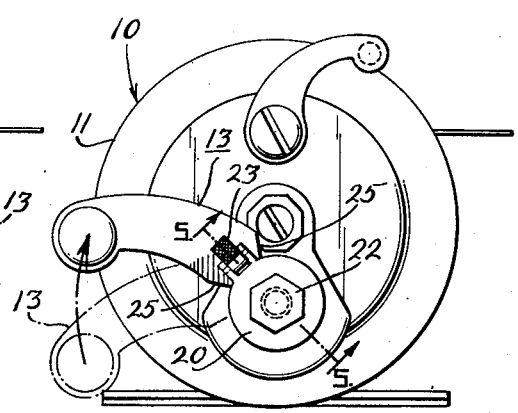
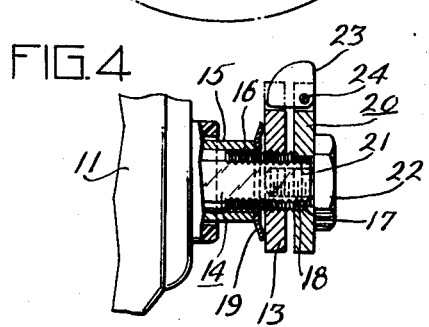
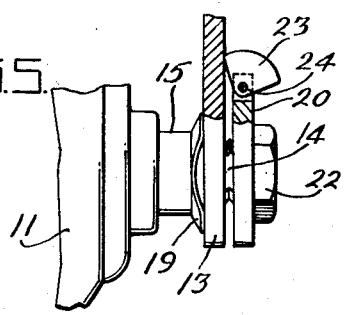
INVENTOR:
JOSEPH M. HOLAHAN
BY
Howson & Howson
ATTYS.

United States Patent Office 2,925,964
Patented Feb. 23, 1960

2,925,964

DRAG FOR FISHING REELS

Joseph M. Holahan, Abington, Pa., assignor to True Temper Corporation, a corporation of Ohio Application August 15, 1957, Serial No. 678,286

3 Claims. (Cl. 242—84.54)

The present invention relates to new and useful improvements in drags for fishing reels and more specifically to modifications in the fishing reel drag mechanism whereby the user of the reel may control the amount of drag by movement of the winding handle.

Prior to the present invention the drag range of a fishing reel drag mechanism of the above type, wherein drag is regulated by rotation of the handle, was limited during use to the adjustment realized by movement of the winding handle between predetermined limit positions.

In many instances the effective drag will change during use of the reel necessitating an adjustment of the reel by the user. This is particularly true in new reels in which the rough surface of the drag washers has a tendency to wear smooth during operation. Because of this attrition a greater compression is required to accomplish the same strength originally set for in the drag. Thus while it is possible for an individual to go fishing several times catching the smaller fish or none at all before re-setting of the drag is necessitated, it is also possible if he hooks a large enough fish making a vicious run, to dissipate the rough surface inside of several minutes; thereby decreasing the drag thus making it difficult for the individual to land his fish.

In addition an increase in drag becomes desirable when the hook snags a submerged object and the fisherman must break his line to get loose. The additional drag is needed since the maximum drag resulting from a proper initial range setting should not exceed the strength of the line.

With the prior drag mechanism, in order to change the limits of the drag range it was necessary to partially disassemble the mechanism and reset the means for limiting the movement of the handle. This operation was both bothersome and time consuming to the fisherman if a change in setting became essential during his fishing time. In some instances inability to make an instantaneous change in drag to the proper degree has resulted, as previously pointed out, in loss of fish and equipment.

According to the present invention the drag range can be varied at any time without disassembly of the mechanism. The resetting is accomplished by disengaging an adjustable latch, thereby allowing the handle to be moved to the desired position. The adjustable latch is clamped moderately by the stop washer so that the latch will not move from one position to another because of its own weight. The reel thus modified is completely practical for all types of fishing without breaking down any part of the reel.

With the foregoing in mind the principal object of the present invention is to provide a drag mechanism wherein the drag range can be varied any maximum or minimum amount beyond the predetermined fixed limits without disassembling the mechanism.

Another object of the present invention is to provide a notched handle which, when engaging the adjustable latch and cooperating therewith during operation, insures a positive union between the two.

A further object of the present invention is to furnish a drag mechanism of the above stated type which may be manufactured easily and economically and can efficiently and effectively be adapted to presently existing fishing reels.

These and other objects of the present invention and the various features and details of the operation and construction thereof are hereinafter more fully set forth and described with reference to the accompanying drawings, in which:

Fig. 1 is a perspective view of a fishing reel embodying the present invention;

Fig. 2 is a side view of the fishing reel of Fig. 1 illustrating the handle being moved to the position of maximum drag on the spool of the reel;

Fig. 3 is a side view similar to Fig. 2 showing the latch mechanism which limits rotation of the handle with respect to the gear sleeve, in the released position and the handle being moved to a position beyond the maximum drag position originally set for;

Fig. 4 is an enlarged sectional view on line 4—4, Fig. 2 portraying the latch mechanism of the present invention in the locked position;

Fig. 5 is an enlarged fragmentary sectional view on line 5—5, Fig. 3 exhibiting the latch mechanism in the disengaged position; and Fig. 6 is a perspective view of the notched handle and stop washer with the components making up the latch mechanism.

Referring more specifically to the drawings and particularly Fig. 1 thereof, reference numeral 10 designates generally a conventional fishing reel having the usual drag mechanism and comprising a pair of side plates 11, 11, a spool 12 and a handle 13 for rotating the spool 12 and also for actuating the drag mechanism. The drag mechanism is of conventional construction and the drag mechanism and the means for operating the same is shown and described in applicant's co-pending application Serial Number 592,653, filed June 20, 1956. As shown in Fig. 4 the drag mechanism consists of a gear sleeve 14 which is rotatably journaled in one side plate of the reel and mounts a gear (not shown) on the inner end thereof. A plurality of friction washers are positioned about the gear sleeve 14, in engagement with one face of the gear. The outer of these washers is engaged by a gear sleeve bushing 15, which is positioned about the gear sleeve 14. The outer end of the gear sleeve is threaded as indicated at 16 while the extreme outer end of the gear sleeve 14 has a reduced squared portion 17 thereon terminating in a shoulder 18 at the threaded portion 16. In addition, thread segments are provided at the corners at the squared portion 17 to permit the handle 13 to be threaded on to the gear sleeve 14. As the handle 13 is threaded on the gear sleeve 14 in the clockwise direction relative to Fig. 2 which is also the direction of rotation of the handle for winding the spool, the inner surface of the handle 13 engages a spring washer 19 and causes the spring washer 19 to force the gear sleeve bushing 15 into pressure applying relation with the drag washers thereby increasing the amount of drag on the spool 12. In addition, a washer 20 having a star shaped opening 21 therein is positioned over the outer end of the gear sleeve 14 in engagement with the shoulder 18. The washer 20 is secured in place on the end of the gear sleeve 14 by means of a bolt 22 which is threadedly received in an opening in the outer end of the gear sleeve 14.

In accordance with the present invention, releasable latch mechanism is provided to define the maximum and minimum drag limits of the handle 13 for the initial predetermined range setting and also to permit the handle 13 to be moved beyond the predetermined limit positions when necessary. This mechanism consists of a latch 23 pivotally connected to the washer 20 by means of a pin 24. The latch 23 is normally positioned in the path of travel of the handle 13 to limit motion of the handle relative to the gear sleeve 14 and thereby limit drag on the spool 12. As set forth previously there are many instances when drag must be increased during operation and accordingly the latch 23 is adjustably connected to the washer 20 to permit the latch 23 to be taken out of the path of travel of the handle 13. Thus, when it is desired, the latch 23 can be released, thereby permitting the handle 13 to be rotated clockwise beyond the set maximum drag position, for example, to the position shown in Fig. 3, to increase the force on the drag washers. Since this adjustment is only intended to be temporary, as necessitated by a particular situation during use, the washer 20 should be reset by the user at his earliest convenience.

Another important feature of the present invention is the provision of means on the handle 13 to insure positive engagement of the handle 13 and latch 23 during normal operation and prevent any camming effect when reeling in the line. This is accomplished by a pair of notches 25, 25 formed on the handle 13 is a position to engage the latch 23 so that the engaging surfaces are parallel to one another, thereby preventing the latch 23 from being moved out of position.

To assemble the drag mechanism the handle 13 is threaded on to the gear sleeve 14 tightly against the spring washer 19 so that the desired maximum drag is exerted on the spool 12. The washer 20 is then positioned on the end of the gear sleeve 14 with the latch 23 extending inwardly toward the side plate of the reel and positioned in advance of the handle 13 in the direction of rotation of the handle 13 for winding the line on the spool 12. With the drag mechanism assembled in this manner, drag can be increased when required by disengaging the latch 23, and rotating the handle 13 in a clockwise direction. Drag can also be reduced to any desired minimum by turning the handle 13 in the counterclockwise direction to any position up to and beyond the latch 23.

To use a reel embodying the drag mechanism with the adjustable latch 23 and notched handle of the present invention, after a fish is hooked, the handle 13 may be rotated clockwise, for example to the position shown in Fig. 2 in order to reel in the fish. If the drag at this point is insufficient to land the fish, drag can be increased by releasing the latch 23 and turning the handle clockwise as shown in Fig. 3. If, however, while reeling in the fish, the fish starts to pull on the line or run, the drag may be decreased by rotating the handle 13 in a counterclockwise direction up to and if necessary beyond the latch 23 to any minimum drag required.

From the foregoing it will be apparent that the present invention provides a novel improvement of the drag mechanism for fishing reels wherein the drag on the line may be varied by the user to any maximum or minimum without disassembly of any part of the reel and within a moment's notice. In addition it will be apparent that the invention provides a novel improvement on a drag mechanism which is of relatively simplified construction, is easy to use and may be manufactured easily and cheaply.

While a particular embodiment of the present invention has been illustrated and described herein, it is not intended to limit the invention to such a disclosure and changes and modifications may be incorporated and embodied therein within the scope of the following claims.

I claim:

1. In a fishing reel comprising a pair of end plates rotatably mounting therebetween a spool and a gear shaft drivably connected to the spool operable to cause rotation of the spool; pressure actuated drag mechanism positioned about the gear shaft operable to exert a drag on the spool upon the application of pressure on the drag mechanism in a direction axially inward of the gear shaft, a handle carried by the gear shaft and mounted for rotation relative to the gear shaft, a latch member carried by the gear shaft for movement between an inner position in the path of travel of the handle and an outer position out of the path of travel of the handle, said latch member operable in the inner position thereof to limit relative rotation of the handle with respect to the gear shaft between predetermined limit positions of said handle in the outer position of the latch being movable beyond said predetermined limit positions, and means interconnecting said handle and said drag mechanism operable in response to a movement of the handle to one limit position thereof to exert pressure axially inward on the drag mechanism and increase drag on the spool, and operable upon movement of the handle to the other limit position thereof to decrease pressure axially inward on the drag mechanism and decrease drag on the spool.

2. Apparatus in accordance with claim 1 wherein means are provided on said handle defining a notch in said handle, said notch having a surface therein operable to engage in parallel relation a corresponding surface on said latch to prevent movement of said latch from said inner position upon movement of the handle to a position in engagement with the latch.

3. Apparatus in accordance with claim 1 wherein a washer member is adjustably mounted on one end of said gear shaft, and means pivotally mounting said latch member on said washer for movement between said inner position in the path of travel of the handle and said outer position out of the path of travel of the handle.

References Cited in the file of this patent

UNITED STATES PATENTS

| | | |
|---|---|---|
| 1,771,454 | Ward | July 29, 1930 |
| 2,712,866 | Llata | July 12, 1955 |
| 2,783,862 | Perinoni | Mar. 5, 1957 |